(12) United States Patent
Ikeda et al.

(10) Patent No.: US 6,510,183 B1
(45) Date of Patent: Jan. 21, 2003

(54) METHOD AND APPARATUS FOR SUPERIMPOSING AND DETECTING AN ADDITIONAL INFORMATION SIGNAL

(75) Inventors: Nozomu Ikeda, Tokyo (JP); Akira Ogino, Tokyo (JP); Takehiro Sugita, Kanagawa (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/140,726

(22) Filed: Aug. 27, 1998

(30) Foreign Application Priority Data

Aug. 29, 1997 (JP) .............................................. 9-234694

(51) Int. Cl.$^7$ .............................................. H04L 27/28
(52) U.S. Cl. ..................................................... 375/260
(58) Field of Search ................................. 375/130, 134, 375/260, 147; 370/342

(56) References Cited

U.S. PATENT DOCUMENTS 5,022,046 A * 6/1991 Morrow, Jr. ................. 375/130
5,022,047 A * 6/1991 Dixon et al. ................. 375/151
5,612,733 A * 3/1997 Flohr ....................... 348/14.16
5,943,331 A * 8/1999 Lavean ........................ 370/335

FOREIGN PATENT DOCUMENTS

| EP | 0545225 | 6/1993 | .......... H04B/7/216 |
| EP | 0778566 | 6/1997 | .......... G11B/20/00 |

* cited by examiner

Primary Examiner—Chi Pham
Assistant Examiner—Kevin M Burd
(74) Attorney, Agent, or Firm—Jay H. Maioli

(57) ABSTRACT

A spectrum spread signal spread by a spread code synchronized with a synchronous signal accompanying to an information signal is superimposed on the information signal and is then transmitted and the spectrum spread signal is then detected using the spread code for detection synchronized with the synchronous signal from the information signal on which the spectrum spread signal is superimposed. A value of the information signal on which the spectrum spread signal is superimposed is added or subtracted depending on the chip value of the relevant spread code for detection in each chip of the spread code for detection. The spectrum spread signal is detected by determining whether the added/subtracted value has exceeded the predetermined threshold value or not.

28 Claims, 13 Drawing Sheets

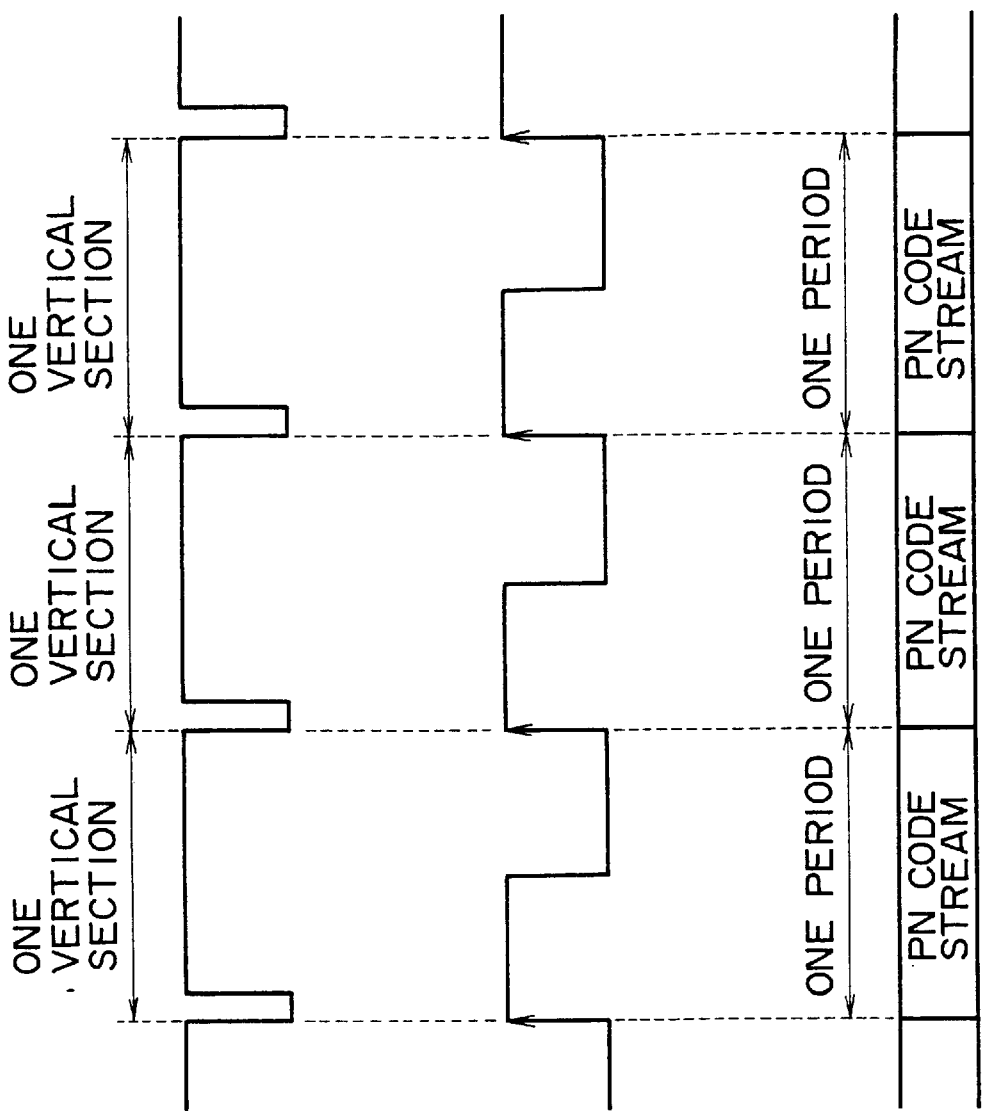

ADDITIONAL INFORMATION SPECTRUM
BEFORE SPECTRUM SPREAD

ADDITIONAL INFORMATION SPECTRUM
AFTER SPECTRUM SPREAD

INFORMATION SIGNAL SPECTRUM TO WHICH SS ADDITIONAL INFORMATION IS SUPERIMPOSED

SIGNAL SPECTRUM AFTER INVERSE SPECTRUM SPREAD IN THE RECORDING APPARATUS SIDE

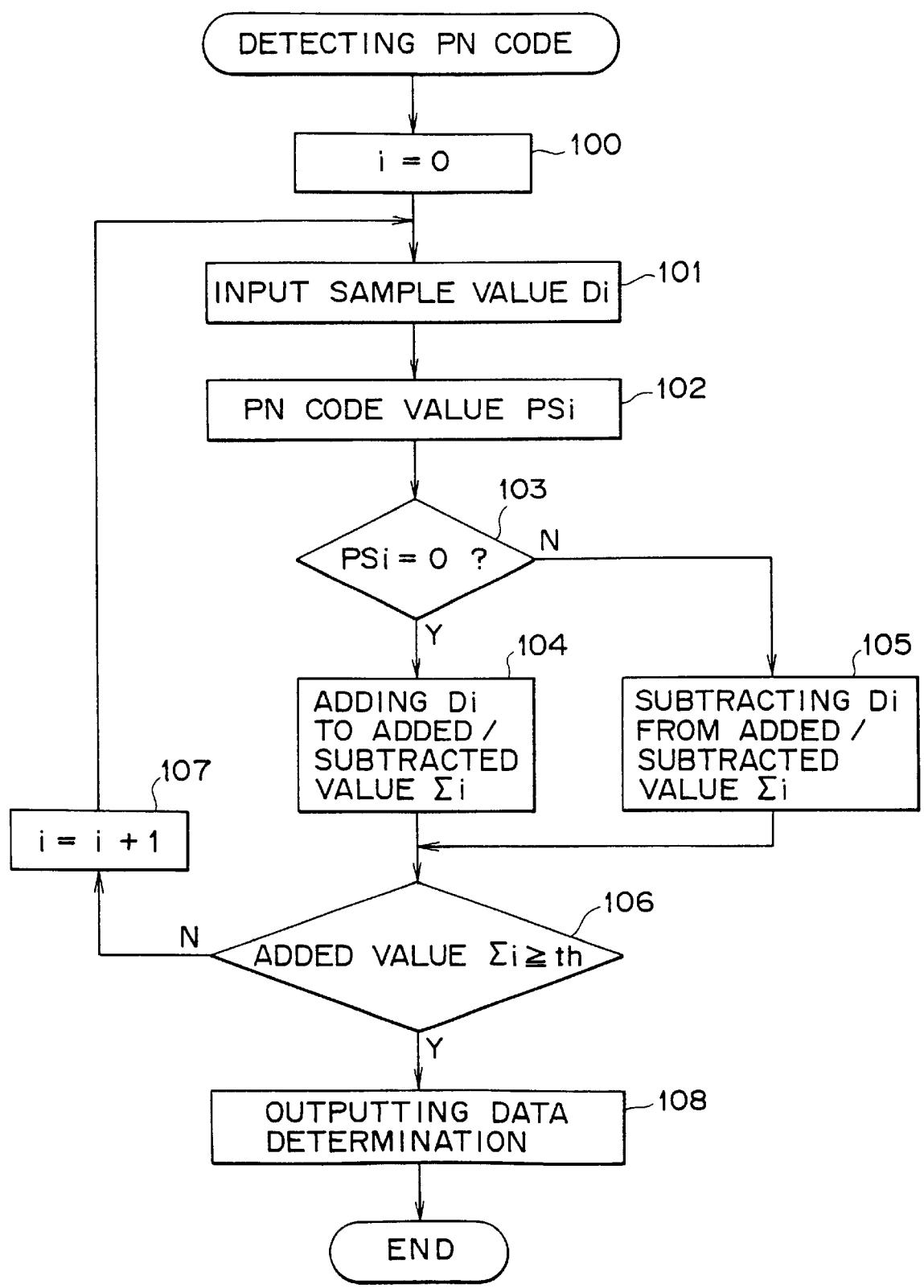

| | | | | | | | |
|---|---|---|---|---|---|---|---|
| FIG. 9A | ADDITIONAL BIT | 0 | | | | 1 | |
| FIG. 9B | SS SIGNAL | 0 | 1 | 1 | 0 | 0 | 1 |
| FIG. 9C | PN CODE | 0 (+) | -1 (-) | 0 (+) | 0 (+) | -1 (-) | 0 (+) |
| FIG. 9D | A/D OUTPUT (VIDEO ELEMENT) | 100 | 200 | 10 | 150 | 100 | 200 | 10 | 150 |
| FIG. 9E | ADDED/SUBTRACTED VALUE | 100 | -100 | -110 | 40 | 100 | -100 | -110 | 40 |
| FIG. 9F | D/A OUTPUT (SS SIGNAL ELEMENT) | 1 | -1 | -1 | 1 | -1 | 1 | 1 | -1 |
| FIG. 9G | ADDED/SUBTRACTED VALUE | 1 | 2 | 3 | 4 | -1 | -2 | -3 | -4 |

F I G. 10
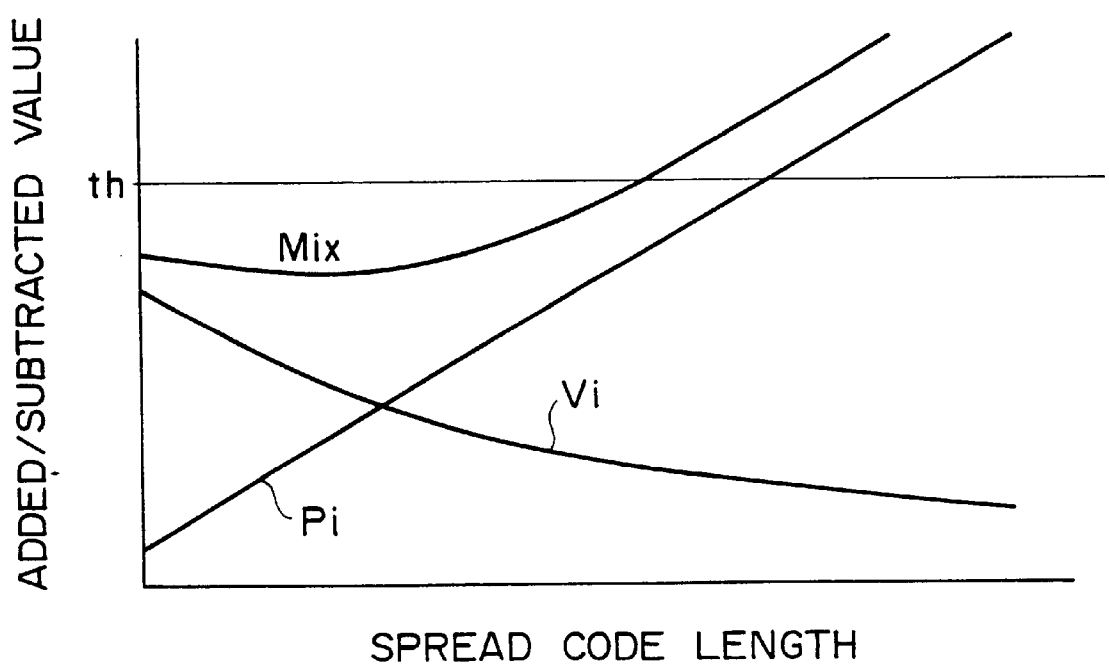

FIG. 14A
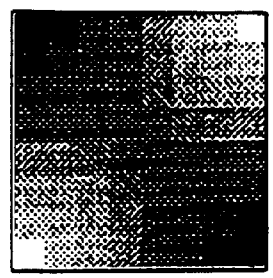
FIG. 14B
↓ DCT COEFFICIENT
| DC | AC1 | AC5 | AC6 | | | | |
|----|-----|-----|-----|---|---|---|---|
| AC2 | AC4 | | | | | | |
| AC3 | | | | | | | |
| | | | | | | | |
| | | | | | | | |
| | | | | | | | |
| | | | | | | | |
| | | | | | | | |
FIG. 15A
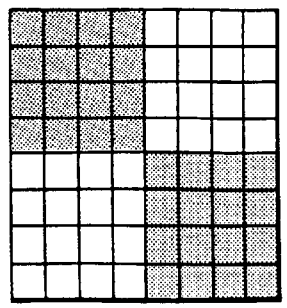
FIG. 15B
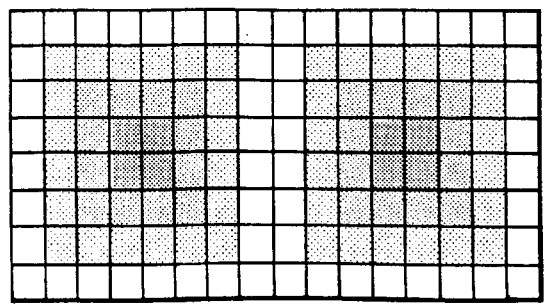

METHOD AND APPARATUS FOR SUPERIMPOSING AND DETECTING AN ADDITIONAL INFORMATION SIGNAL

BACKGROUND OF THE INVENTION

1. Field of a the Invention

The present invention relates to a method and an apparatus for detecting a spectrum spread signal of an additional information signal which is spectrum spread and superimposed to an information signal such as a video signal.

2. Description of the Related Art

A digital information recording apparatus such as a digital VTR and MD(Minidisc) recording and reproducing apparatus is now widely spreading and moreover a DVD (Digital Video Disk or Digital Versatile Disk) having the recording function has also be developed. In these digital information recording apparatuses, various additional information signals can be recorded in relation to the digital video signal, digital audio signal and data of computer as the main information signal.

In this case, an additional information signal is a digital signal and it is added to the digital information signal as the signal to be recorded to the area which is discriminated regionally from the digital information signal such as the header area, for example, which as added to the data in unit of block of the digital information signal and the other TOC (Table of Contents) area, etc.

As explained above, in the additional information signal recording system of the related art, the additional information signal is not superimposed in direct to the digital information signal such as a header area but superimposed to an indirect area. Therefore, the additional information signal can rather easily be removed by the filtering or alteration and it is sometimes impossible to detect the necessary additional information signal with a recording apparatus or reproducing apparatus. Particularly when a control information or copy right information to prevent unfair duplication is added as the additional information signal, since such additional information signal is removed, the predetermined object cannot be attained in some cases.

Moreover, when the additional information signal is added to the indirect area as explained above, if the digital information signal is converted to an analog signal, only the main information signal can be obtained and thereby the additional information signal is lost. It means that even when a measure to prevent unfair duplication of the digital information signal is provided by superimposing the above-mentioned duplication preventing control signal is superimposed as the additional information signal, if the additional information signal is converted to an analog signal, the means for preventing duplication can no longer be operated effectively.

As a method of superimposing an additional information signal to solve a problem of the additional information to be lost and a problem in conversion to analog signal, the applicant of the present invention has proposed a system wherein the video signal is recorded as the digital signal or analog signal by spectrum spreading the additional information signal such as a duplication preventing control signal and then superimposing this spectrum spread additional information signal to the video signal (U.S. patent application Ser. No. 08/75510).

In this system, the PN (Pseudorandom Noise) series code (hereinafter referred to as PN code) to be used as the spread code is generated in a higher period and this code is then multiplied with the additional information signal for the purpose of spectrum spread. Thereby, the additional information signal such as a narrow band and high level duplication preventing control signal is converted to a broad band and very low level signal. This spectrum spread additional information signal, namely the spectrum spread signal is superimposed to an analog video signal and is then recorded to a recording medium. In this case, the video signal to be recorded to the recording medium may be analog signal or digital signal.

In this system, since the additional information signal such as the duplication preventing control signal is superimposed to the video signal as the spectrum spread broad band and very low level signal, it is difficult, for example, for a person who is trying to execute unfair duplication to remove the superimposed duplication preventing control signal from the video signal.

Meanwhile, it is possible to detect and utilize the additional information signal such as the superimposed duplication preventing control signal by executing the inverse spectrum spread. Therefore, for example, the duplication preventing control signal can surely be provided to the recording apparatus side together with the video signal and this duplication preventing control signal is detected, in the recording apparatus side and the duplication control can surely be realized depending on the detected duplication preventing control signal.

Since the additional information signal superimposed to the information signal such as a video signal is not removed from the main information signal at the time of reproducing the information signal, the spectrum spread signal must be superimposed, as is explained above, to the main information signal in such a low level as not giving influence on the reproduced output of the information signal. In order to superimpose the spectrum spread signal to the main information signal in a very small level, the spectrum spread signal must have sufficiently large spread code length.

Meanwhile, when the inverse spread is requested to detect the spectrum spread signal, a spread code synchronized with the spread code in the spectrum spread process is generated and this spread code for inverse spread is multiplied with the main information signal to which the spectrum spread signal is superimposed in order to detect the additional information signal.

In this case, the synchronous detection of the spread code for inverse spread has been conducted, in the related art, by the method of using the matched filter and by the sliding correlation method, but when the spread code length is large, as explained above, detection becomes impossible or a longer time is taken for the detection. Moreover, since the multiplication is required for inverse spread after the synchronous detection of the spread code for inverse spread, here is also a problem that a longer time is required.

When a longer time is taken for detection of the spectrum spread signal, the duplication control of the video signal is executed, for example, after a considerable time has passed from the start of the reproducing operation of the video signal and thereby the effective duplication control can no longer be executed.

Considering the background explained previously, it is therefore an object of the present invention to provide a method and an apparatus to quickly detect with the simplified structure the spectrum spread signal superimposed to the information signal.

SUMMARY OF THE INVENTION

The present invention proposes a method and an apparatus for detecting an additional information signal to produce the spectrum spread additional information signal through the spectrum spread of additional digital information signal using the spectrum spread code produced in synchronization with the synchronous signal included in the main information signal and to detect the additional digital information signal from the main information signal with the additional information produced by superimposing the spectrum spread additional information signal to the main information signal, wherein the spectrum spread code same as the spectrum spread code synchronized with the synchronous signal included in the main information signal with the additional information signal is produced, a value of the main information signal with the additional information corresponding to each chip of the spectrum spread signal is obtained as the accumulated value through addition and subtraction depending on each chip value and the additional digital information signal in the main information signal with the additional information is detected by determining whether the accumulated value has exceeded the positive or negative threshold value.

According to the present invention, when the information signal is, for example, a video signal, since the spread code is synchronized with the video synchronous signal, synchronous generation control of the spread code for inverse spread is basically not required. At the time of detection of spectrum spread signal, the value of the video signal is added, for example, when the chip value is "0" or subtracted when the chip value is "1" for each chip of the spread code synchronized with the video synchronous signal. The spread code is a random number and the number of chips of "0" is equal to the number of chips of "1".

Since the video signal is basically not correlated with the spread code, the addition or subtraction result value in regard to the video signal itself tends to be converged to zero through the addition or subtraction as explained above. On the other hand, since the level of video signal is increased or decreased depending on the chip value "0" or "1", the addition or subtraction result value regarding the spectrum spread signal is routinely increased or decreased. Accordingly, the spectrum spread signal superimposed on the video signal can be detected by previously determining the predetermined threshold value to the addition and subtraction result value and then detecting the level exceeding the threshold value.

In this case, since it is not required that the spread signal is multiplied with the information signal to which the spectrum spread signal is superimposed and the inverse spread is conducted, the structure can be simplified and the detection of the spectrum spread signal can be realized by the software.

When the spectrum spread signal is superimposed to the video signal, for example, in such a manner that level addition is conducted to the video signal when a chip value is, for example, "0" or level subtraction is conducted to the video signal when a chip value is "1", when the additional information bit is "0", the level addition and subtraction is conducted to the video signal depending on the chip value of the spread code. On the other hand, when the additional information bit is "1", level addition or subtraction is conducted, for the purpose of superimposing, for the video signal depending on the value of chip in which the spread code is inverted. Therefore, when the addition and subtraction result value exceeds the positive threshold value, the additional information bit can be detected as "0" and when the addition and subtraction result value exceeds the negative threshold value, the additional information bit can be detected as "1".

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIGS. 6A to 6C show a timing chart for explaining the synchronous timing of the spectrum spread signal to be superimposed;

FIG. 8 is a flowchart showing the flow of main operations in the preferred embodiment of the spectrum spread signal detecting method of the present invention;

FIGS. 9A to 9G are diagrams for explaining main operations of the preferred embodiment of the spectrum spread signal detecting method of the present invention;

FIG. 10 is a diagram for explaining main operations of the preferred embodiment of the spectrum spread signal detecting method of the present invention;

FIGS. 14A and 14B are diagrams for explaining superimposing of one chip of the spectrum spread signal to a plurality of samples; and FIGS. 15A and 15B are diagrams for explaining superimposing of one chip of the spectrum spread signal to a plurality of samples.

DETAILED DESCRIPTION OF THE PREFERRED EMBODIMENTS

The preferred embodiments of the present invention will be explained with reference to the accompanying drawings. In the embodiments explained below, the present invention can be applied to the system where the duplication is controlled on the occasion of duplication by supplying an analog output video signal from the DVD reproducing apparatus as an example of the video output signal to a DVD recording apparatus. In this case, the additional information superimposed is a duplication preventing control signal.

In this system, the spectrum spread duplication preventing control signal is superimposed to the analog output video signal and is then output in the DVD reproducing apparatus and this output signal is then supplied to the DVD recording apparatus. In the DVD recording apparatus, the superimposed spectrum spread duplication preventing control signal is detected from an analog output video signal from the DVD reproducing apparatus and the duplication control is executed depending on the detected output. The spectrum spread signal detecting method of the present invention is applied to the spectrum spread signal detecting section of the DVD recording apparatus.

First, the DVD reproducing apparatus in which the duplication preventing control information is spectrum spread and superimposed will be explained.

In the following embodiment, the spectrum spread signal is superimposed to the luminance signal Y of the video signal and is not superimposed to the color signal C. It is of course possible to superimpose the spectrum spread signal to the color signal C. However, since the color signal of the video signal is transmitted using the elements of a couple of phase axes of color difference signal, for example and color is reproduced by the phases of these two phase axes, when the spectrum spread signal is superimposed to the color signal, it appears as change of hue even if the spectrum spread signal is superimposed in a very lower level and such change can be detected easily and thereby it is now difficult to superimpose the spectrum spread signal without giving influence on change of hue. Therefore, in this embodiment, the spectrum spread signal is superimposed only to the luminance signal. However, for simplification of explanation, a video signal is used in the following explanation without discriminating the luminance signal Y and color signal C.

Figure 2:
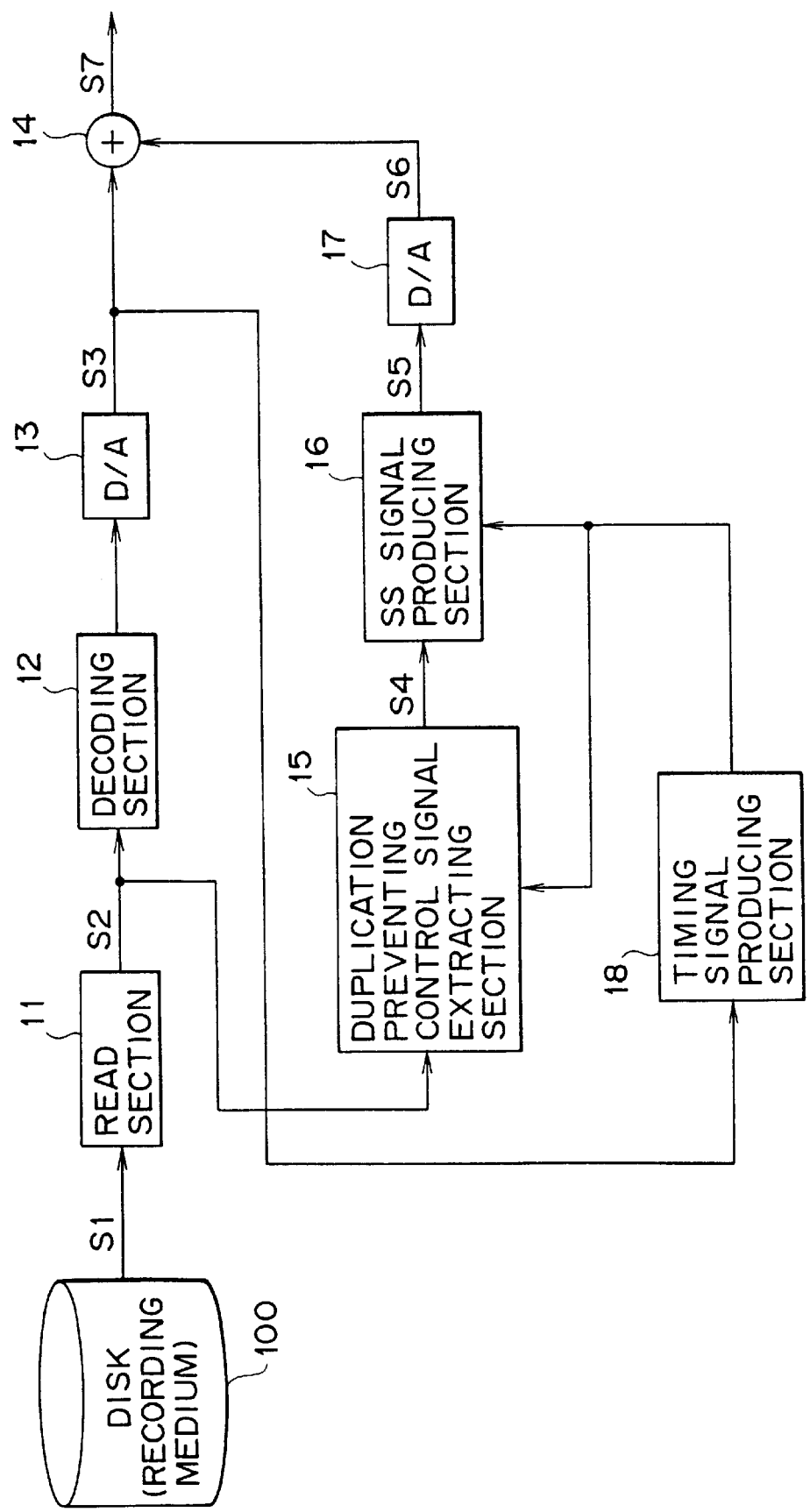
FIG. 2 is a block diagram for explaining an example of superimposing of the spectrum spread signal to the main information signal.

In FIG. 2, a disk 100 is a recording medium on which digital video signal and audio signal are recorded and a duplication preventing control signal is also recorded as the additional information. In this embodiment, the disk is a DVD. The duplication preventing control signal is sometime recorded to the track area called TOC (Table of Contents) and directory at the innermost circumference of the disk 100 or inserted or recorded to the track in the different recording areas where the video data and audio data are recorded. In the example explained hereunder, the duplication preventing control signal is recorded by the latter method, wherein when the video data is read, the duplication preventing control signal is simultaneously read.

The duplication preventing control signal indicates inhibition or acknowledgment of duplication of the video signal or limitation of duplication generation and is inserted to the video data for the purpose of addition. The disk 100 is loaded to the information output apparatus and the signal recorded may be read depending on the read request.

As shown in FIG. 2, the DVD reproducing apparatus of this example is provided with a readout section 11, a decoding section 12, a D/A converter 13, a superimposing section 14, a duplication preventing control signal extracting section 15, an SS (SS is abbreviation of spectrum spread) signal producing section 16, a D/A converter 17 and a timing signal producing section 18.

The readout section 11 extracts a digital reproduced video signal element S2 from the signal S1 obtained by reproducing the information recorded in a disk 100 and then supplies this digital reproduced video signal element S2 to the encoding section 12 and duplication preventing control signal extracting section 15.

The decoding section 12 executes the decoding process to the digital reproduced video signal element S2 and then supplies the signal to the D/A converter 13 to obtain the analog video signal S3 including the vertical synchronous signal and horizontal synchronous signal therefrom. This analog video signal S3 is also supplied to the superimposing section 14 and the timing signal producing section 18.

The duplication preventing control signal extracting section 15 extracts the duplication preventing control signal S4 from the information data stream of the reproduced video signal element S2 extracted by the readout section 11 and then supplies this signal S4 to the SS signal producing section 16.

The SS signal producing section 16 produces a PN code stream and spectrum spreads the duplication preventing control signal S4 using this PN code stream.

Figure 3:
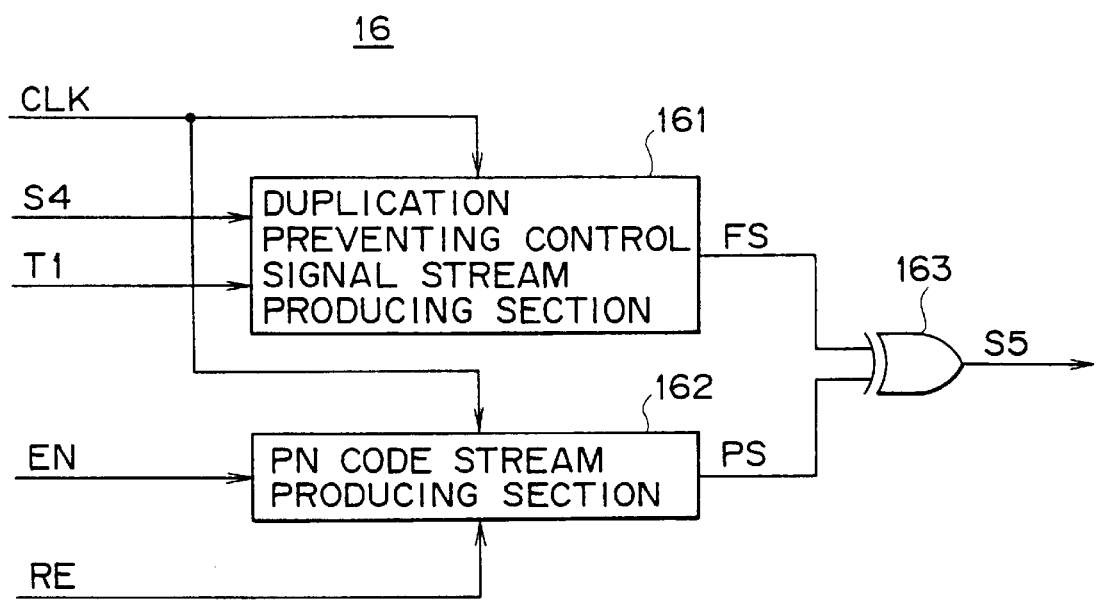
FIG. 3 is a diagram showing an example of a section to produce the spectrum spread signal to be superimposed.

FIG. 3 shows a structure example of the SS signal producing section 16 of this embodiment. As shown in FIG. 3, the SS signal producing section 16 is provided with a duplication preventing control signal stream producing section 161, a PN code stream producing section 162 and an exclusive OR (EXOR) gate 163.

To the duplication preventing control signal stream producing section 161, a clock signal CLK, a duplication preventing control signal S4 from the duplication preventing control signal extracting section 15 and a timing signal T1 are supplied. In this case, the timing signal T1 indicates the timing of partitioning of each one bit of the duplication preventing control signal S4. Moreover, in this first embodiment, the clock signal CLK is the clock signal synchronized with the reproduced digital signal.

The duplication preventing control signal stream producing section 161 produces the duplication preventing control signal stream FS by outputting the duplication preventing control signal S4 as many as the number of the predetermined clocks in every bit and then supplies this signal stream to the EXOR gate 163. In the case of this example, a low bit duplication preventing control signal stream FS of one or two bits instructing inhibition or acknowledgment of duplication is produced, for example, for each section of one vertical period.

To the PN code stream producing section 162, the clock signal CLK, enable signal EN and initialization signal (reset signal) RE are supplied. The enable signal EN sets the PN code stream producing section 162 to the operating condition. This signal is produced when the power of the DVD reproducing apparatus is turned ON and is then supplied to the PN code stream producing section 162. Moreover, the reset signal RE produces the PN code stream having the predetermined code pattern from the beginning.

The PN code stream producing section 162 is set to the operation ready condition depending on the enable signal EN. The PN code stream producing section 162 produces the PN code stream from the beginning for each supply timing of the reset signal RE and produces the PN code stream PS synchronously with the clock signal CLK. The produced PN code stream PS is supplied to the EXOR gate.

Figure 4:
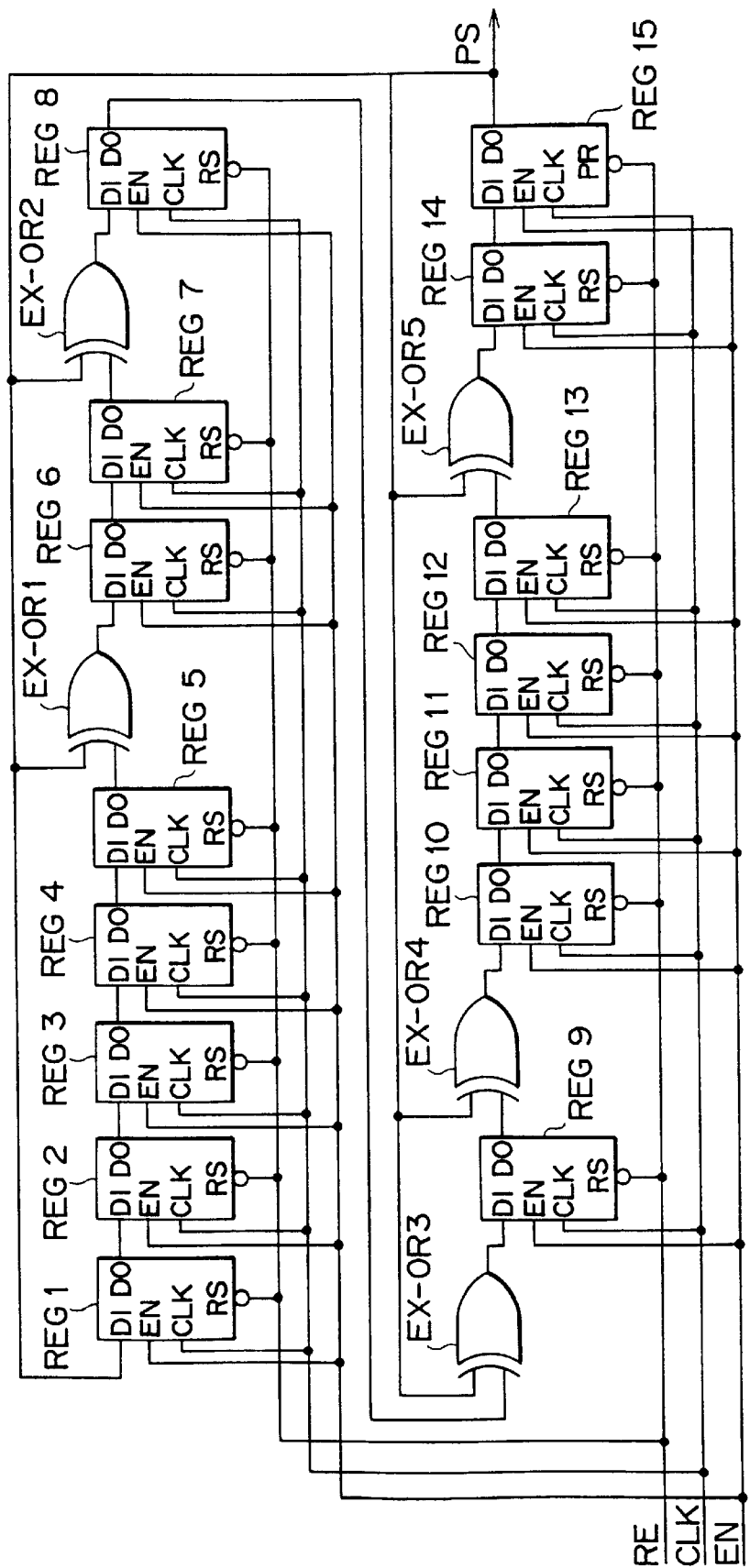
FIG. 4 is a diagram showing an example of a PN code stream producing section.

FIG. 4 shows a structure example of the PN code stream producing section 162. The PN code stream producing section 162 of this example is composed of 15 flip-flops REG to REG15 forming shift registers of 15 stages and EXOR gates EX-OR1 to EX-OR5 for calculating adequate tap outputs of the shift registers. The PN code stream producing section 162 shown in FIG. 8 generates, as explained above, the M series PN code stream PS on the basis of the reset signal RE, clock signal CLK and enable signal EN.

The EXOR gate 163 executes the spectrum spreading for the duplication preventing control signal stream FS using the PN code stream PS from the PN code stream producing section 162. From this EXOR gate 163, the spectrum spread signal S5 can be obtained as the spectrum spread duplication preventing control signal.

Figure 5:
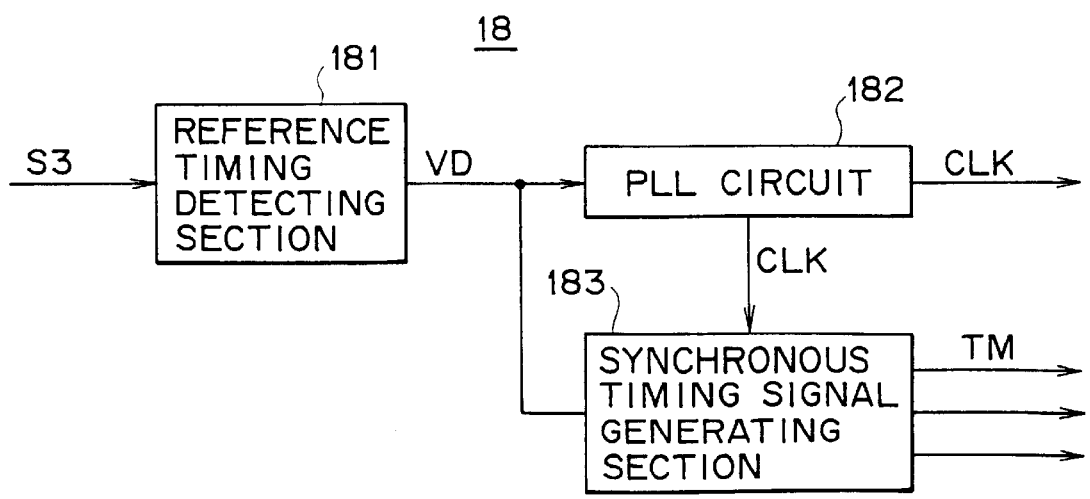
FIG. 5 is a diagram showing a structural example of a timing signal producing section shown in FIG. 5 and FIG. 1.

In the case of this example, the clock signal CLK and reset signal RE are supplied from the timing signal producing section 18. This timing signal producing section 18 produces the timing signal synchronized with the timing of the video synchronous signal detected from the analog video signal S3 from the D/A converter 13 and can also be formed, for example as shown in FIG. 5, of the reference timing detecting section 181, PLL circuit 182 and synchronous timing signal generating section 183.

The reference timing detecting section 181 extracts, from the analog video signal S3, the vertical synchronous signal VD (refer to FIG. 6A), in this example, as the reference timing signal and then supplies this signal VD to the PLL circuit 182 and synchronous timing signal producing section 183.

The PLL circuit 182 produces the clock signal CLK synchronized with the timing of the vertical synchronous signal VD. In the case of this example, this clock signal CLK is the pixel clock synchronized with the pixel sample of the digital video signal S2 and this signal is supplied, as shown in FIG. 5, to the video timing signal producing section 183 and also to the duplication preventing control signal extracting section 15 and SS signal producing section 16.

The synchronous timing signal producing section 183 produces, based on the signal synchronized with the timing of the vertical synchronous signal VD and the clock signal CLK, a spread synchronous timing signal TM (refer to FIG. 6B) and supplies this spread synchronous timing signal TM to the PN code stream producing section 162 of the SS signal producing section 16 as the reset signal RE. The synchronous timing signal producing section 183 also supplies the other various necessary timing signals to the necessary sections.

The spectrum spread signal S5 obtained from the SS signal producing section 16 as explained above is supplied to the D/A converter 17 and is then supplied, as the analog SS signal S6, to the superimposing section 14. In the case of this example, this D/A converter 17 changes the analog SS signal S6 to the predetermined positive very low level when the spectrum spread signal S5 is "0" or to the predetermined negative very low level when the signal S5 is "1".

The superimposing section 14 receives the analog video signal S3 from the D/A converter 13 and the analog SS signal S6 from the D/A converter 17 to form the analog video signal S7 to which the analog SS signal S6 is superimposed as the output. The analog video signal S7 to which this analog SS signal S6 is superimposed is supplied to a monitor receiver for displaying an image and a recording apparatus for recording the video signal to a recording medium.

Figure 7A:
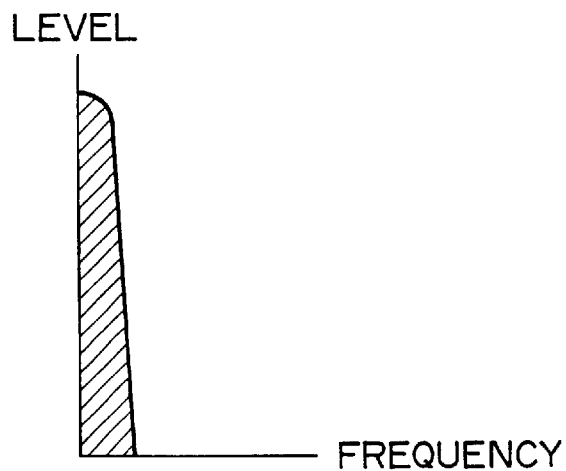
FIGS. 7A to 7D shows graphs for explaining relationship between the main information signal and spectrum spread signal superimposing level.
Figure 7B:
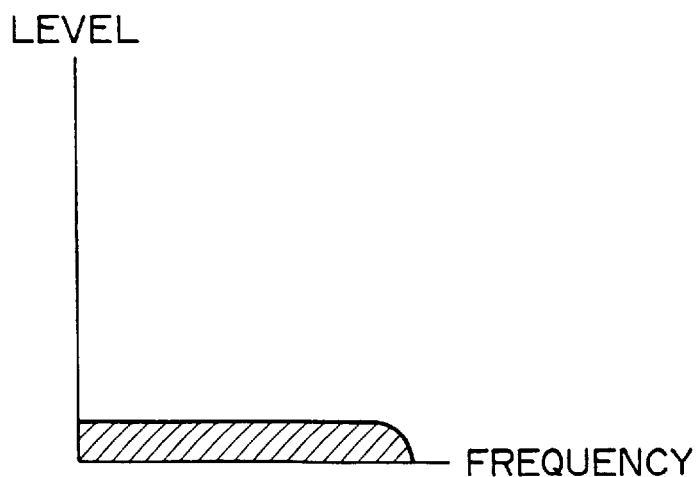

FIGS. 7A to 7D show the relationship between the spectrum spread signal and video signal using spectra. The spectrum spread additional information signal includes a small amount of information and has a low bit rate. This signal is a narrow band signal as shown in FIG. 7A. When this signal is subjected to the spectrum spread, it changes to the broad band signal as shown in FIG. 7B. In this case, the level of spectrum spread signal becomes small in the reverse proportion to the expansion ratio of the band.

Figure 7C:
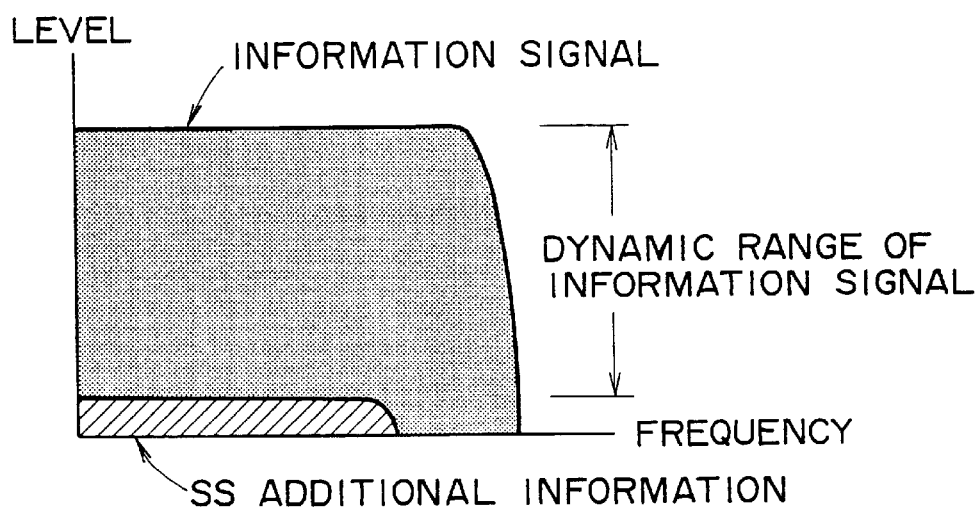

This spectrum spread signal is superimposed to the video signal in the superimposing section 14. In this case, as shown in FIG. 7C, the spectrum spread signal is superimposed in the level lower than the dynamic range of the information signal such as video signal. Since the spectrum spread signal is superimposed as explained above, the information signal such as the video signal is not almost deteriorated. Accordingly, when the video signal to which the spectrum spread signal is superimposed is supplied to the monitor receiver and image is reproduced, the image is not almost influenced by the spectrum spread signal and good image can be reproduced.

Figure 7D:
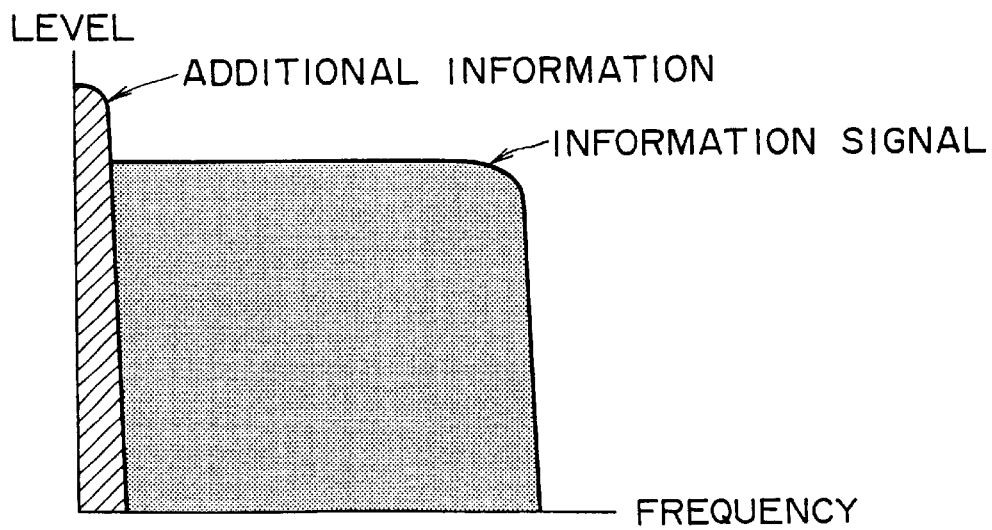

However, as will be explained, when the inverse spectrum spread is conducted to detect the superimposed spectrum spread signal, the spectrum spread signal is recovered again as the narrow band signal as shown in FIG. 7D. Since the sufficient band spreading coefficient is given, the power of the additional information signal after the inverse spread exceeds the information signal, assuring sufficient detection.

In this case, since the additional information signal superimposed to the information signal such as the video signal is superimposed in the same time and same frequency as the information signal such as video signal, the additional information signal cannot be deleted or corrected easily by use of a filter or simple replacement of the information.

Therefore, the additional information signal such as duplication preventing control signal as explained above can surely be transmitted in accompaniment with the video signal by superimposing the necessary additional information signal to the video signal for the recording purpose. Moreover, when the additional information signal spectrum spread in the signal power in comparison with the information signal such as the video signal is superimposed to the information signal as explained in the embodiment explained above, deterioration of the information signal can be minimized.

Therefore, when the duplication preventing control signal, for example, is superimposed to the information signal such as video signal as the additional information signal, since alteration and removal of the duplication preventing signal is difficult as explained above, duplication preventing control to surely prevent unfair duplication can be enabled.

Moreover, in the structure explained above, since the spectrum spread is executed using the PN code stream of the vertical period with the vertical synchronous signal defined as the reference signal, the PN code for inverse spectrum spread which is required to detect the spectrum spread signal from the video signal can be easily produced on the basis of the signal synchronized with the vertical synchronous signal detected from the video signal. Namely, the synchronous control of the PN code for inverse spread using, for example, the sliding correlator is no longer required. As explained above, the PN code stream for inverse spread can easily be produced, the inverse spectrum spread can be done quickly and the additional information signal such as the duplication preventing control signal which is spectrum spread and superimposed to the video signal can be detected quickly.

Next, a preferred embodiment of the spectrum spread signal detecting apparatus of the present invention will be explained, in which the analog video signal S7 to which the spectrum spread signal from the DVD reproducing apparatus is superimposed is received and this signal is applied to the DVD apparatus for recording the information.

Figure 1:
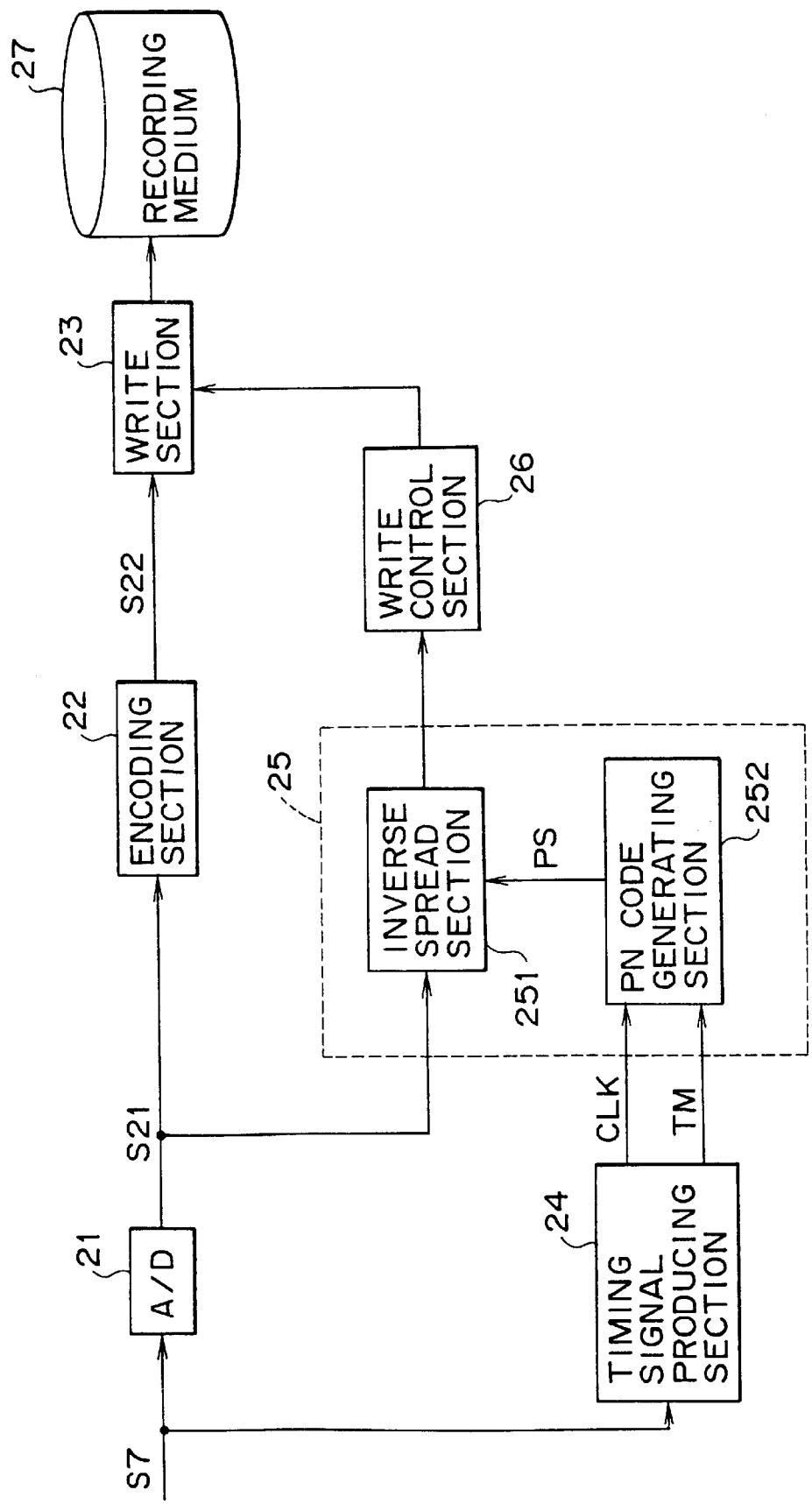
FIG. 1 is a block diagram showing an example of a recording apparatus to which a preferred embodiment of the spectrum spread signal detecting method of the present invention is applied.

FIG. 1 shows an example of structure of the DVD apparatus of this embodiment which is provided with an A/D converter 21, an encoding section 22, a write section 23, a timing signal producing section 24, an SS signal detecting section 25, and a write control section 26 for controlling acknowledgment/inhibition of the duplication. Moreover, a recording medium 27 is a DVD, in this example, to which the video signal is written.

The analog video signal S7 from the DVD reproducing apparatus is converted to the digital signal by the A/D converting circuit 21 and is then supplied to the encoding section 22 as the digital video signal S21. The encoding section 22 receives the digital video signal S21 to execute the encoding process such as removal of video synchronous signal and data compression of the digital video signal in view of forming the digital video signal S22 for recording. This digital video signal S22 is then supplied to the write section 23.

The write section 23 is controlled, as will be explained later, by the write control section 26 to write the digital video signal from the encoding section 22 to the recording medium 27 when duplication is acknowledged or not to write the digital video signal to the recording medium 27 when duplication is inhibited.

The spectrum spread signal is detected as explained below. The input analog video signal S7 is supplied to a timing signal producing section 24. This timing signal producing section 24 has the same structure as the timing signal producing section 18 shown in FIG. 5 to extract the vertical synchronous signal VD from the input analog video signal S7 and to produce the clock signal CLK and PN code generation synchronous timing signal TM on the basis of the vertical synchronous signal VD. These clock signal CLK and synchronous timing signal TM are sent to the SS signal detecting section 25.

The SS signal detecting section 25 is composed of an inverse spreading section 251 and a PN code generating section 252. The PN code generating section 252 has a structure similar to the PN code generating section 162 shown in FIG. 3 to form the SS signal producing section 16 shown in FIG. 2. This PN code generating section 252 receives the clock signal CLK and synchronous timing signal TM from the timing signal producing section 24 to generate the PN code stream PS and then supplies this PN code stream PS to the inverse spreading section 251. When jitter element of the video synchronous signal is neglected, the PN code stream PS from the PN code generating section 252 becomes the PN code synchronized with the PN code stream from the PN code generating section 162 of the DVD reproducing apparatus explained above.

The inverse spreading section 251 detects the spectrum spread signal by obtaining correlation between the PN code stream PS produced in the PN code generating section 252 and the digital video signal S21 to which the spectrum spread signal from the A/D converter 21 is superimposed.

FIG. 8 is a flow chart showing the flow of spectrum spread signal detecting process in the inverse spreading section 251. In this example, since the spectrum spread signal is synchronized with the vertical synchronous signal, this detecting process is carried out for every vertical section (field).

First, initialization is conducted in the step 100. Next, in the step 101, the pixel value of the digital video signal S21 from the A/D converter 21 is obtained as the input sample value Di. Next, in the step 102, the code value PSi of the PN code stream PS corresponding to the relevant pixel is obtained. Next, in the step 103, it is determined the PN code value PSi is "0" or "1".

When the PN code value PSi is "0", the input sample value Di is added to the preceding added/subtracted value Σi in the step 104. Moreover, when the PN code value Si is "1", the input sample value Di is subtracted from the preceding added/subtracted value Σi in the step 105.

In the step 106, following the step 104 or step 105, it is determined whether the added/subtracted value Σi has exceeded predetermined threshold value th or not. When the added/subtracted value Σi has not exceeded the threshold value th, process skips to the step 107 to set I=i+1. Thereafter, returning to the step 101, correlation with the PN code value PSi regarding the next input sample value Di is calculated as explained above and the result thereof is added to the added/subtracted value Σi.

When the added/subtracted value Σi is determined, in the step 106, to have exceeded the threshold value th, the process goes to the step 109 under the supposition that the spectrum spread signal is detected for the purpose of data determination. Namely, the spectrum spread additional information bit is determined whether it is "0" or "1" and it is then output. This determined output is supplied to the write control section 26.

This spectrum spread signal detecting method will be explained with reference to FIGS. 9A to 9G and FIG. 10.

When the PN code stream from the PN code generating section 162 in the superimposing operation is "0110 . . . ", if the additional information bit is "0" as shown in the left side of FIG. 9A, the spectrum spread signal S5 becomes equal to "0110 . . . " as shown in the left side of FIG. 9B. Moreover, when the additional information bit is "1" as shown in the right side of FIG. 9A, the spectrum spread signal S5 is inverted to become "1001 . . . " as shown in the right side of FIG. 9B.

As explained above, the analog conversion signal S6 of the spectrum spread signal S5 is superimposed to the analog video signal (luminance signal) in such a manner that the positive level is superimposed when the spectrum spread signal value is "0" or negative level is superimposed when the value is "1". Accordingly, element of the spectrum spread signal superimposed is indicated in FIG. 9F, when the low level for the superimposing is defined, for example, as 1 in terms of the digital value level (decimal number) for simplification. The low level to be superimposed is not limited to 1 and may be about 2 to 10 in terms of the decimal number.

Meanwhile, the PN code stream PS from the PN code generating section 252 of the SS signal detecting section 25 is shown in FIG. 9C. In this case, since the video element in the digital signal S21 from the A/D converter 21 does not have any correlation with the PN code stream PS or has a small correlation, the correlation of the video element included in the added/subtracted value Σi changes to be converged to zero as indicated by a curve Vi in FIG. 10.

Namely, for example, when the digital value level (decimal number) of the video element is that as indicated in FIG. 9D, the added/subtracted value Σi of the relevant video element gradually becomes small, as shown in FIG. 9E, by the arithmetic operation in the steps 102 to 105.

Meanwhile, in regard to the spectrum spread signal element included in the digital signal S21 (FIG. 9F), the added/subtracted value Σi gradually becomes large in the positive direction, as shown in FIG. 9G, when the additional information bit is "0", while it gradually becomes large in the negative direction when the additional information bit is "1".

Therefore, when the additional information bit is "0", for example, the added/subtracted value Σi increases like a curve Pi of FIG. 10. Accordingly, the combining value with the added/subtracted value of the video element changes as indicated by the curve Mix of FIG. 10. Therefore, the predetermined positive threshold value th is previously set and when the added/subtracted value Σi has exceeded the threshold value th, the spectrum spread additional information bit "0" is detected. Detection of the additional information bit "0" is equal to detection of the PN code stream itself as the spectrum spread signal.

As explained above, the predetermined negative threshold value th is preset and when the added/subtracted value $\Sigma i$ exceeds the threshold value th, the spectrum spread additional information bit "1" is detected.

Accordingly, in the flow chart of FIG. 8 explained above, the comparison process of the added/subtracted value $\Sigma i$ and threshold value th is identical to comparison between the positive threshold value and negative threshold value explained above. The data determination in the step 108 determines whether the additional information bit is "0" or "1" depending on the determination which threshold value the value has exceeded.

Depending on the data content of the duplication preventing control signal detected as explained above, the write control section 26 controls the write section 23. Namely, if content instructed by the detected duplication preventing control signal means the inhibition of duplication, the write control section 26 controls the write section 23 so that the digital video signal is not written to the recording medium 27.

Even in the case when the additional information of a plurality of bits is superimposed to one vertical section, the additional information bits can be detected. Moreover, it is also possible that the inverse spread of additional information of a plurality of bits can be conducted by defining the process by the flow chart of FIG. 8 as the PN code stream detecting process and then multiplying the detected PN code stream with the digital signal S21 from the A/D converter 21.

In above explanation, the addition and subtraction of the digital values are carried out for addition and subtraction for detecting the spectrum spread signal, but such addition and subtraction can also be conducted by providing a charging/discharging capacitor for the analog signal S7 before the A/D conversion and then charting and discharging this capacitor depending on the value of chip of the PN code stream.

In above example, the superimposing level is set to positive or negative in accordance with the chip value "0", "1" of the spread code, but it is also possible to superimpose the additional signal in such a manner that one is zero level and the other is positive or negative level. In this case, the present invention can naturally be applied.

In above explanation, one chip of the spread code is assigned for every pixel sample of the video signal and the spectrum spread signal is superimposed to the video signal. However, it is also possible to assign one chip of the spread code in unit of a plurality of pixel samples in place of every pixel sample.

As a plurality of pixel samples, a plurality of pixel samples of the one dimensional region in the horizontal or vertical direction may be used or a plurality of pixel samples of the two dimensional region in the horizontal or vertical direction may be used.

When one chip of the spread code is assigned in unit of a plurality of pixel samples and the spectrum spread signal is superimposed to the video signal, an average value of such a plurality of pixel samples is used for addition and subtraction of every chip of the spread code when the spectrum spread signal is detected. Namely, total sum of the relevant pixel samples is added or subtracted depending on the chip value of the spread code. When such total sum is used, faithful correlation between the video information of a plurality of pixel sample regions and spread code can be obtained.

Moreover, when one chip of the spread code is assigned in unit of a plurality of pixel samples and the spectrum spread signal is superimposed to the video signal, the typical value among a plurality of samples can be used for addition and subtraction in every chip of the spread code when the spectrum spread signal is detected.

Figure 11:
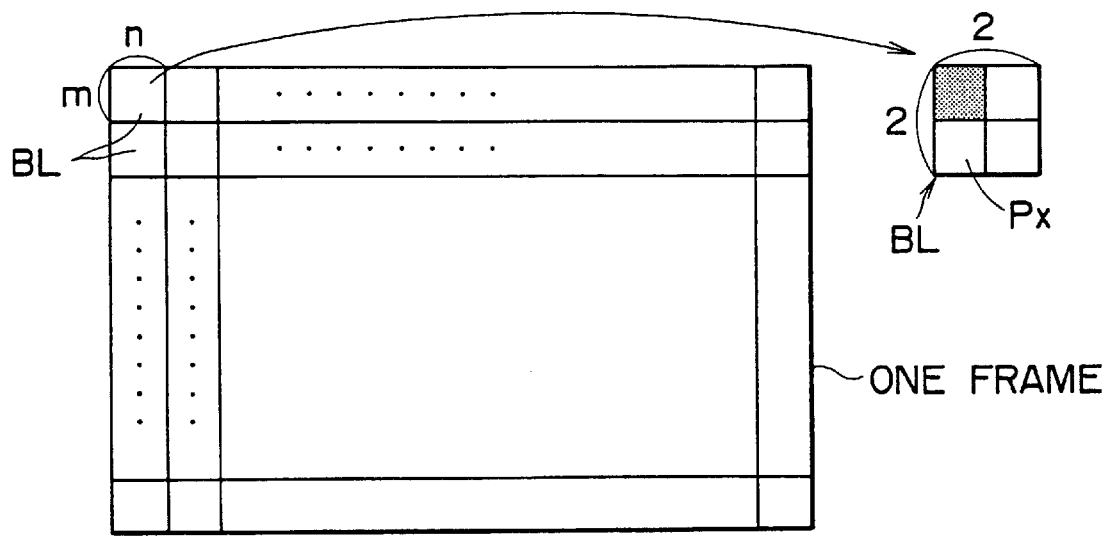
FIG. 11 is a diagram for explaining superimposing of one chip of the spectrum spread signal to a plurality of samples.

For example, as shown in FIG. 11, when the spectrum spread signal is superimposed to each chip of the PN code for every block BL consisting of the number of pixels n=2 in the horizontal direction and the number of pixels n=2 in the vertical direction for the image of one frame, one pixel at the meshed position of four pixels in one block BL is defined as the typical pixel of each block BL and the pixel value of this position is added or subtracted depending on the chip value of the spread code. In FIG. 11, Px indicates one pixel.

In the case of the video signal, the pixel information in the limited region generally has intensive correlation. Therefore, even if all of a plurality of pixel samples are not used, correlation between the video element of spread code in the relevant pixel sample regions can be detected. When such a typical value is used, number of times of the addition or subtraction can be set lower than the number of pixels and thereby the detecting speed can be improved.

Figure 12:
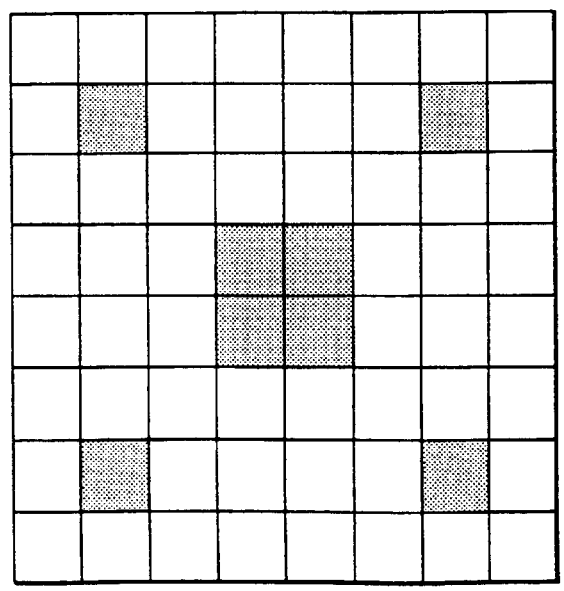
FIG. 12 is a diagram for explaining superimposing of one chip of the spectrum spread signal to a plurality of samples.

When many pixels are included in the block BL corresponding to one ship of the spread code, it is recommended that a plurality of pixel positions are selected as the typical values and addition or subtraction is conducted at the time of detecting the spectrum spread signal using the total sum of a plurality of pixel values at the relevant pixel positions. For example, when one block BL includes 64 (8×8) pixels as shown in FIG. 12, addition or subtraction is conducted using the total sum of the typical pixels at the position indicated as the meshed positions.

Moreover, when the video signal is recorded or transmitted through digital compression, the digital video data is generally divided to the blocks BL in unit of a plurality of pixels as explained above to execute the compression process. However, when the DCT conversion (discrete cosine conversion) is used as the data compression, addition or subtraction for detection of the spectrum spread signal explained above can be performed using the DCT coefficient.

Figure 13:
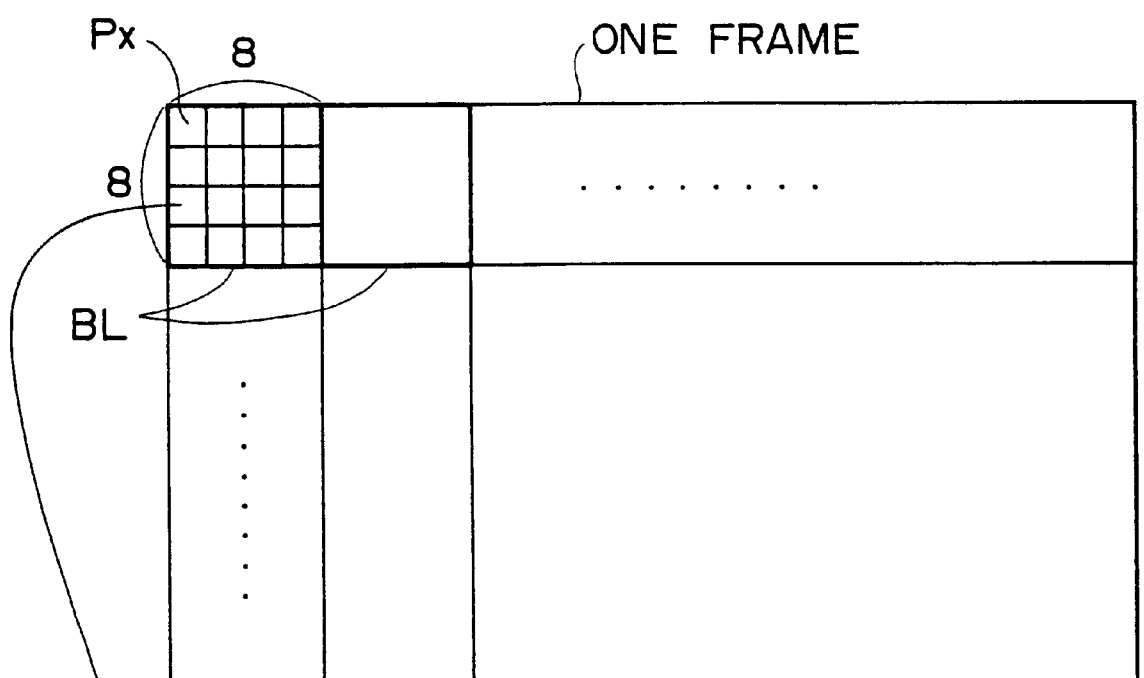
FIG. 13 is a diagram for explaining superimposing of one chip of the spectrum spread signal to a plurality of samples.

Namely, for example, in the case of the compression by MPEG system, the video data of one frame is divided in unit of a block BL consisting, for example, of 8×8=64 pixels as shown in FIG. 13 and the DCT conversion is executed in unit of the block to convert the digital video data of time region in to the data of frequency region to produce the DCT coefficient as shown in the figure in order to generate the variable length code from this DCT coefficient.

To the video data to be compressed, one chip of the spread code is assigned in unit of the block BL and the spectrum spread signal is superimposed. In this case, one chip is kept at the constant level at the time of superimposing. In this case, since the spectrum spread signal becomes a DC element in the block BL, the spectrum spread signal element is included in the DC coefficient which is the coefficient of the DC element of the DCT coefficient.

Therefore, in this case, the spectrum spread signal can be detected, in the stage of the DCT coefficient before the compressed video signal data is perfectly decoded, using this DC coefficient. Namely, the DC coefficient is extracted from the compressed data and this value is added or subtracted depending on the chip value of the spread code. Thereby, the spectrum spread signal can be detected in the same manner as that explained above. In this case, the spectrum spread signal can be detected regarding the DCT coefficient of the serial data of the so-called bit stream.

When the spectrum spread signal is superimposed by keeping one chip of the spread code to the constant level in unit of the block BL, it is liable that the superimposing level of the spectrum spread signal of each block becomes visible at the reproduced video image.

Considering this point, for example, the superimposing level is changed chip by chip of the spread code so that the video pattern as shown in FIG. 14A can be obtained. The pattern of FIG. 14A is included only in the AC coefficient AC4 at the position of (2,2) of the DCT coefficient when the block BL is converted by the DCT conversion method as shown in FIG. 14B.

Therefore, in this case, the spectrum spread signal can be detected using the coefficient AC4 in the stage of the DCT coefficient before the compressed video signal data is decoded perfectly. Namely, the coefficient AC4 is extracted from the compressed data and this value is added or subtracted depending on the chip value of the spread code. Thereby, the spectrum spread signal can be detected in the same manner as that explained above.

As the video pattern which does not make obvious the superimposing level change in each block on the reproduced video image, the patterns shown in FIG. 15A and FIG. 15B may be used. In this case, since the spectrum spread signal element is included in a plurality of DCT coefficients, these DCT coefficients are used to execute the addition or subtraction for detection of the above-mentioned spectrum spread signal. As the method of using a plurality of DCT coefficients, the method of using the typical points or the method using the average value may be used as desired.

In above explanation, the additional information signal spectrum spread and superimposed is a duplication preventing control signal, but such additional information signal is not limited to the duplication preventing control signal but can also be applied, for example, to the information regarding the digital video signal, for example, to the time code information to identify each field and copy right information. As the copy right information, for example, the apparatus number to identify the relevant recording apparatus can also be used. When this apparatus number is superimposed to the digital video signal Vi and is recorded, the history of duplication can easily be traced.

Moreover, in above explanation, the spectrum spread signal is superimposed to the analog video signal, but it is of course possible to superimpose the spectrum spread signal to the digital video signal and in this case, the present invention can naturally be applied.

In addition, as the synchronous signal of the spectrum spread signal synchronized with the video signal, the horizontal synchronous signal may be used in place of the vertical synchronous signal. Moreover, the synchronous period of the spectrum spread signal is not limited to one vertical period or one horizontal period but applied to a plurality of vertical synchronous periods and a plurality of horizontal synchronous periods.

Furthermore, the main information signal to which the spectrum spread signal will be superimposed is not limited to the video signal but any signal which is accompanied by the synchronous signal can be used. For example, the digital signal including the synchronous timing signal having the constant period can be considered as the object of the main information signal of this invention.

Moreover, in above explanation, the present invention has been applied to the recording and reproducing system, but the present invention can also be applied to the system for detecting the spectrum spread signal from the receiving information signal in the receiving side in which the spectrum spread signal is superimposed to the main information signal and it is then transmitted using various transmission media, such as electromagnetic wave, cable and infrared beam, etc.

In above explanation, moreover, the additional information bits are spectrum spread by the PN code, but the present invention can be applied to the system where the PN code of different series is superimposed to the additional information bit and the spectrum spread signal is detected by detecting these PN codes.

The present invention can also be applied for detection of the relevant pn code in such a case that it is determined that "1" or "0" is respectively transmitted, for example, when the PN code is superimposed or not superimposed and the PN code itself is superimposed to the main information signal as the spectrum spread signal.

As explained above, according to the present invention, the spectrum spread signal superimposed to the main information signal can be detected quickly with simplified structure.

What is claimed is:

1. A method of superimposing and of detecting an additional information signal comprising the steps of:
    producing a first code synchronized with a synchronous signal included in a main information signal;
    producing a low-level wide band additional information signal from said additional information signal using said first code;
    producing a superimposed main information signal by superimposing said low-level wide-band additional information signal on said main information signal;
    producing a second code equal to said first code synchronized with said synchronous signal included in said superimposed main information signal;
    obtaining an accumulated value by sequentially adding a sample value of said superimposed main information signal to said accumulated value when a corresponding chip value of said second code is a first predetermined value, and sequentially subtracting said sample value of said superimposed main information signal from said accumulated value when said corresponding chip value of said second code is a second predetermined value for all chips of said second code until said accumulated value is greater or equal to a threshold value; and
    detecting said additional information signal in said superimposed main information signal by determining whether said accumulated value has exceeded said threshold value.

2. The method of superimposing and of detecting an additional information signal according to claim 1, wherein said low-level wide-band additional information signal is produced by one of inverting and not inverting each of said chip values of all chips of said second code depending on a value of said additional information signal.

3. The method of superimposing and of detecting an additional information signal according to claim 1, wherein said superimposed main information signal is produced by superimposing one of a positive and a negative analog signal depending on said additional information signal on said main information signal.

4. The method of superimposing and of detecting an additional information signal according to claim 1, wherein said main information signal is a video signal and said first code and said second code are produced in synchronization with an other synchronous signal of said video signal.

5. The method of superimposing and of detecting an additional information signal according to claim 4, wherein each of said chips of said second code corresponds to a plurality of pixels of said video signal and said adding and subtracting said main information signal with said additional information, depending on said respective chip values of all chips of said second code, is conducted using a selected one of said plurality of pixels corresponding to each of said chips of said second code.

6. The method of superimposing and of detecting an additional information signal according to claim 4, wherein each of said chips of said second code corresponds to a plurality of pixels of said video signal and said adding and subtracting said main information signal with said additional information, depending on said respective chip values of all chips of said second code, is conducted using an average value of said plurality of pixels corresponding to each of said chips of said second code.

7. The method of superimposing and of detecting an additional information signal according to claim 4, wherein said video signal is a digital signal and is compressed by discrete cosine transform (DCT) conversion in all blocks formed of a plurality of pixels, each of said chips of said spread code corresponds to said blocks and addition and subtraction of said main information signal with said additional information is conducted using one of a plurality of DCT coefficients of said blocks corresponding to each of said chips of said second code.

8. The method of superimposing and of detecting an additional information signal according to claim 1, wherein said additional information signal is a duplication control signal for controlling an acknowledgment and an inhibition of a duplication of said main information signal on a recording medium.

9. A method of detecting an additional information signal by producing a low-level wide-band additional information signal from said additional information signal using a first code produced in synchronization with a synchronous signal included in a main information signal and for detecting said additional information signal in a superimposed main information signal produced by superimposing said low-level wide-band additional information signal on said main information signal, comprising the steps of:

producing a second code equal to said first code synchronized with said synchronous signal included in said superimposed main information signal;

obtaining an accumulated value by sequentially adding a sample value of said superimposed main information signal to said accumulated value when a corresponding chip value of said second code is a first predetermined value, and sequentially subtracting said sample value of said superimposed main information signal from said accumulated value when said corresponding chip value of said second code is a second predetermined value for all chips of said second code until said accumulated value is greater or equal to a threshold value; and detecting said additional information signal in said superimposed main information signal by determining whether said accumulated value has exceeded said threshold value.

10. The method of detecting an additional information signal according to claim 9, wherein said main information signal is a video signal and said second code is produced in synchronization with an other synchronous signal of said video signal.

11. The method of detecting an additional information signal according to claim 10, wherein each of said chips of said second code corresponds to a plurality of pixels of said video signal and said adding and subtracting said main information signal with said additional information, depending on said respective chip values of all chips of said second code, is conducted using a selected one of said plurality of pixels corresponding to each of said chips of said second code.

12. The method of detecting an additional information signal according to claim 10, wherein each of said chips of said second code corresponds to a plurality of pixels of said video signal and said adding and subtracting said main information signal with said additional information, depending on said respective chip values of all chips of said second code is conducted using a mean value of said plurality of pixels corresponding to each of said chips of said second code.

13. The method of detecting an additional information signal according to claim 10, wherein said video signal is a digital signal and is compressed through discrete cosine transform (DCT) conversion in all blocks formed of a plurality of pixels, each of said chips of said second code corresponds to said blocks and addition and subtraction of a main information signal with said additional information is conducted using one of a plurality of DCT coefficients of said blocks corresponding to each of said chips of said second code.

14. The method of detecting an additional information signal according to claim 10, wherein said additional information signal is a duplication control signal for controlling an acknowledgment and an inhibition of a duplication of said main information signal on a recording medium.

15. An apparatus for superimposing and for detecting an additional information signal, comprising:

first code producing means for producing a first code synchronized with a synchronous signal included in a main information signal;

producing means for producing a low-level wide-band additional information signal from said additional information signal using said first code;

signal superimposing means for producing a superimposed main information signal by superimposing said low-level wide-band additional information signal on said main information signal;

second code producing means for producing a second code equal to said first code synchronized with said synchronous signal included in said superimposed main information signal;

accumulating means for obtaining an accumulated value by sequentially adding a sample value of said superimposed main information signal to said accumulated value when a corresponding chip value of said second code is a first predetermined value, and sequentially subtracting said sample value of said superimposed main information signal from said accumulated value when said corresponding chip value of said second code is a second predetermined value for all chips of said second code until said accumulated value is greater or equal to a threshold value; and signal comparing means for detecting said additional information signal in said superimposed main information signal by determining whether said accumulated value has exceeded said threshold value.

16. The apparatus for superimposing and for detecting an additional information signal according to claim 15, wherein said producing means produces said low-level wide-band additional information signal by one of inverting and not inverting each of said chip values of all chips of said second code depending on a value of said additional information signal.

17. The apparatus for superimposing and for detecting an additional information signal according to claim 15, wherein said signal superimposing means produces said superimposed main information signal by superimposing one of a positive and a negative analog signal on said main information signal depending on said additional information signal.

18. The apparatus for superimposing and for detecting an additional information signal according to claim 15, wherein said main information signal is a video signal and said first code producing means and said second code producing means respectively produce said first code and said second code in synchronization with an other synchronous signal of said video signal.

19. The apparatus for superimposing and detecting an additional information signal according to claim 18, wherein each of said chips of said first code and said second code corresponds to a plurality of pixels of said video signal and said adding and subtracting said main information signal with said additional information by said accumulating means is conducted using a selected one of said plurality of pixels corresponding to each of said chips of said first code and said second code.

20. The apparatus for superimposing and detecting a spectrum spread signal according to claim 18, wherein each of said chips of said first code and said second code corresponds to a plurality of pixels of said video signal and said adding and subtracting said main information signal with said additional information by said accumulation means is conducted using a mean value of said plurality of pixels corresponding to each of said chips of said first code and said second code.

21. The apparatus for superimposing and for detecting a spectrum spread signal according to claim 18, wherein said video signal is a digital signal and is compressed through discrete cosine transform (DCT) conversion in all blocks formed of a plurality of pixels, each of said chips of said first code and said second code corresponds to said blocks and said addition and subtraction of a main information signal with said additional information by said accumulation means is conducted using one of a plurality of DCT coefficients of said blocks corresponding to each of said chips of said first code and said second code.

22. The apparatus for superimposing and for detecting an additional information signal according to claim 15, wherein said additional information signal is a duplication control signal for controlling an acknowledgment and an inhibition of a duplication of said main information signal on a recording medium.

23. An apparatus for detecting an additional information signal by producing a low-level wide-band additional information signal from said additional information signal using a first code produced in synchronization with a synchronous signal included in a main information signal and for detecting said additional information signal in a superimposed main information signal produced by superimposing said low-level wide-band additional information signal on said main information signal, comprising:

producing means for producing a second code equal to said first code synchronized with said synchronous signal included in said superimposed main information signal;

accumulation means for obtaining an accumulated value by sequentially adding a sample value of said superimposed main information signal to said accumulated value when a corresponding chip value of said second code is a first predetermined value, and sequentially subtracting said sample value of said superimposed main information signal from said accumulated value when said corresponding chip value of said second code is a second predetermined value for all chips of said second code until said accumulated value is greater or equal to a threshold value; and signal comparing means for detecting said additional information signal in said superimposed main information signal by determining whether said accumulated value has exceeded said threshold value.

24. The apparatus for detecting an additional information signal according to claim 23, wherein said main information signal is a video signal and said second code is produced in synchronization with an other synchronous signal of said video signal.

25. The apparatus for detecting an additional information signal according to claim 24, wherein each of said chips of said second code corresponds to a plurality of pixels of said video signal and said adding and subtracting said main information signal with said additional information by said accumulation means is conducted using a selected one of said plurality of pixels corresponding to each of said chips of said second code.

26. The apparatus for detecting a spectrum spread signal according to claim 24, wherein each of said chips of said second code corresponds to a plurality of pixels of said video signal and said adding and subtracting said main information signal with said additional information by said accumulation means is conducted using a mean value of said plurality of pixels corresponding to each of said chips of said second code.

27. The apparatus for detecting a spectrum spread signal according to claim 24, wherein said video signal is a digital signal and is compressed through discrete cosine transform (DCT) conversion in all blocks formed of a plurality of pixels, each of said chips of said second code produced by said spread code producing means corresponds to said blocks and addition and subtraction of a main information signal with said additional information by said accumulation means is conducted using one of a plurality of DCT coefficients of said blocks corresponding to each of said chips of said second code.

28. The apparatus for detecting an additional information signal according to claim 23, wherein said additional information signal is a duplication control signal for controlling an acknowledgment and an inhibition of a duplication of said main information signal on a recording medium.

\* \* \* \* \*